United States Patent
Ioffe et al.

(10) Patent No.: US 8,509,499 B2
(45) Date of Patent: Aug. 13, 2013

(54) AUTOMATIC FACE DETECTION AND IDENTITY MASKING IN IMAGES, AND APPLICATIONS THEREOF

(75) Inventors: Sergey Ioffe, Mountain Veiw, CA (US); Lance Williams, Mountain Veiw, CA (US); Dennis Strelow, Sunnyvale, CA (US); Andrea Frome, Berkeley, CA (US); Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/302,634

(22) Filed: Nov. 22, 2011

(65) Prior Publication Data
US 2012/0070042 A1    Mar. 22, 2012

Related U.S. Application Data

(62) Division of application No. 12/078,464, filed on Mar. 31, 2008, now Pat. No. 8,098,904.

(51) Int. Cl.
*G06K 9/36* (2006.01)

(52) U.S. Cl.
USPC .......................................................... 382/118

(58) Field of Classification Search
None
See application file for complete search history.

(56) References Cited

U.S. PATENT DOCUMENTS

| | | | | |
|---|---|---|---|---|
| 6,067,399 A * | 5/2000 | Berger | | 386/280 |
| 6,959,099 B2 | 10/2005 | Gutta et al. | | |
| 7,697,797 B2 * | 4/2010 | Chin et al. | | 385/12 |
| 7,787,664 B2 * | 8/2010 | Luo et al. | | 382/118 |
| 2002/0015514 A1 | 2/2002 | Kinjo | | |
| 2004/0001220 A1 | 1/2004 | Gorday et al. | | |
| 2005/0286799 A1 * | 12/2005 | Huang et al. | | 382/275 |
| 2007/0086675 A1 * | 4/2007 | Chinen et al. | | 382/284 |
| 2007/0237421 A1 | 10/2007 | Luo et al. | | |
| 2007/0258656 A1 | 11/2007 | Aarabi | | |

FOREIGN PATENT DOCUMENTS

| | | |
|---|---|---|
| CN | 1656502 A | 8/2005 |
| JP | 2003-319158 A | 11/2003 |
| JP | 2005-512203 A | 4/2005 |
| WO | WO 03/049035 | 6/2003 |
| WO | WO 2008/016645 A2 | 2/2008 |

OTHER PUBLICATIONS

Williams, Mark, "Better Face-Recognition Software" http://technologyreview.com/Infotech/18796/, May 30, 2007, 3 pgs.

Rowland et al., "Manipulating Facial Appearance through Shape and Color", IEEE Computer Graphics and Applications, vol. 15, No. 5, Sep. 1995, pp. 70-76.

(Continued)

*Primary Examiner* — Brian P Werner
(74) *Attorney, Agent, or Firm* — Sterne, Kessler, Goldstein & Fox P.L.L.C.

(57) ABSTRACT

A method and system of identity masking to obscure identities corresponding to face regions in an image is disclosed. A face detector is applied to detect a set of possible face regions in the image. Then an identity masker is used to process the detected face regions by identity masking techniques in order to obscure identities corresponding to the regions. For example, a detected face region can be blurred as if it is in motion by a motion blur algorithm, such that the blurred region can not be recognized as the original identity. Or the detected face region can be replaced by a substitute facial image by a face replacement algorithm to obscure the corresponding identity.

19 Claims, 11 Drawing Sheets

(56) References Cited

OTHER PUBLICATIONS

Blanz et al., "A Morphable Model for the Synthesis of 3D Faces", International Conference on Computer Graphics and Interactive Techniques, Proceedings of the 26th Annual Conference on Computer Graphics and Interactive Techniques, ACM, New York, NY, 1999, pp. 187-194.

Cabral et al., "Imaging Vector Fields Using Line Integral Convolution" International Conference on Computer Graphics and Interactive Techniques, Proceedings of the 20th annual conference on Computer graphics and interactive techniques, ACM, New York, NY, 1993, pp. 263-270.

Jones et al., "Statistical Color Models with Application to Skin Detection" International Journal of Computer Vision, Kluwer Academic Publishers, Hingham, MA, vol. 46, Issue 1, Jan. 2002, pp. 81-96.

Forsyth, et al., "Automatic Detection of Human Nudes", International Journal of Computer Vision, Kluwer Academic Publishers, Hingham, MA, vol. 32. Issue 1, Aug. 1999, pp. 63-77.

Yang et al,, "Detecting Faces in Images: A Survey", IEEE Transaction on Pattern Analysis and Machine Intelligence, vol. 24, No. 1, Jan. 2002, pp. 34-58.

Newton et al., "Preserving Privacy by De-Identifying Face Images" IEEE Transactions on Knowledge and Data Engineering, vol. 17, No. 2, Feb. 2005, pp. 232-243.

International Preliminary Report on Patentability and Written Opinion of the International Searching Authority for International Application No. PCT/US2009/001988, mailed on Oct. 14, 2010, 5 pages.

The International Search Report cited in International Application No. PCT/US2009/001988, dated Mar. 31, 2009, 3 pages.

The Written Opinion of the international Searching Authority cited in International Application No. PCT/US2009/001988, dated Mar. 31, 2009, 4 pages.

English translation of First Office Action dated Aug. 20, 2012 in Chinese Patent Application No. 200980118727.7, Google Inc., filed Mar. 31, 2009 (17 pages).

English translation of Office Action in Japanese Patent Publication No. 2011-502949 A, Immutopics, Inc., published Jan. 27, 2011 (9 pages).

English language Abstract of Japanese Patent Publication No. 2003-319158 A, Japanese Patent Office, Patent & Utility Model Gazette DB, Patent Abstract of Japan, (2013) (listed on the accompanying from PTO/SB/08A as FP4.).

Yu et al., "Privacy Preserving: Hiding a Face in a Face," in Proeceedings of the 8th Asian conference on Computer vision—Volume Part II (ACCV'07), Yasushi Yagi, Sing Bing Kang, In So Kweon, and Hongbin Zha (Eds.), vol Part II. Springer-Verlag, Berlin, Heidelberg, 651-661.

Supplementary European Search Report for EP Application No. EP 09 75 5189, Munich, Germany, mailed on Feb. 4, 2013.

* cited by examiner

AUTOMATIC FACE DETECTION AND IDENTITY MASKING IN IMAGES, AND APPLICATIONS THEREOF

CROSS REFERENCE TO RELATED APPLICATIONS

This application is a divisional of U.S. Non-Provisional Application Ser. No. 12/078,464, filed on Mar. 31, 2008, now allowed, which is hereby incorporated by reference in its entirety.

FIELD OF THE INVENTION

The present invention relates to image processing, and more particularly to identity masking by automatically detecting and processing face regions in an image, and applications thereof.

BACKGROUND OF THE INVENTION

Recent advances in computer networking and processing make images easily accessible. However, public access of images, especially images containing human faces raises concerns about privacy. There have been some previous efforts to protect the privacy of people appearing in an image by making their faces unrecognizable to obscure their identities. To obscure a face in an image, a region containing the face has to be identified first. Automatic face detection techniques can help to identity face regions when processing a large number of images. However, the accuracy of automatic face detection techniques raises concerns. There can be false positives where detected regions do not correspond to faces. There can also be regions containing faces that are not detected. In addition, to obscure a face, the detected face region in the image is usually replaced by a replacement shape with solid color or mosaics. Although the identities are obscured for the individuals whose faces otherwise appear in the image, the image appearance is adversely affected by replacing faces with other shapes used in such methods.

BRIEF SUMMARY OF THE INVENTION

The present invention relates to identity masking by automatically detecting and processing face regions in an image, and applications thereof. In an embodiment, a face detector detects a set of possible face regions in an image, and an identity masker uses an identity masking algorithm to process the detected face regions in order to obscure the identifying features within the detected face regions. In an embodiment, the identity masker uses a motion blur algorithm to blur a detected face region so that the blurred face region appears as if it is in motion and the corresponding identity cannot be recognized. In another embodiment, the identity masker uses a face replacement algorithm to replace a detected face region with a substitute facial image so that the corresponding identity is obscured. In yet another embodiment, the identity masker uses a motion blur algorithm to blur some detected face regions, and uses a face replacement algorithm to replace other detected face regions to obscure corresponding identities.

In one embodiment, to make sure identities in an image are obscured, the sensitivity of the face detector can be adjusted to detect possible regions that may correspond to a face. Then a pre-defined verification analysis is used to reject false positives i.e. features which do not correspond to human faces in the image. In an embodiment, a skin color analysis is performed to reject false positives detected by the face detector. Alternatively, a blur algorithm based on such verification criteria can be used to process potentially false positives. In an embodiment, a blur algorithm is applied. on the basis of the probability that an area of color is a natural skin color. Higher probability results in greater blurring.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

The present invention relates to identity masking by automatically detecting and processing face regions in an image, and applications thereof. In the detailed description. of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In order to protect privacy of individuals whose faces appear in an image, identity masking is performed to process the image before it can be viewed by others. In an embodiment of the invention, a face detection algorithm is applied to detect regions in the image that may contain faces, then an identity masking algorithm is selected to process faces in the detected regions in order to obscure the corresponding identities. After identity masking, the processed image can be stored in an image database and is ready to be accessed by other viewers.

To preserve the layout and overall appearance of an image, techniques such as motion blur algorithms and face replacement algorithms are preferred for identity masking. A motion blur algorithm can make a detected face appear as if photographed while in motion but its identity is obscured. A face replacement algorithm can replace the detected face with some other facial image to obscure its identity.

Figure 1:
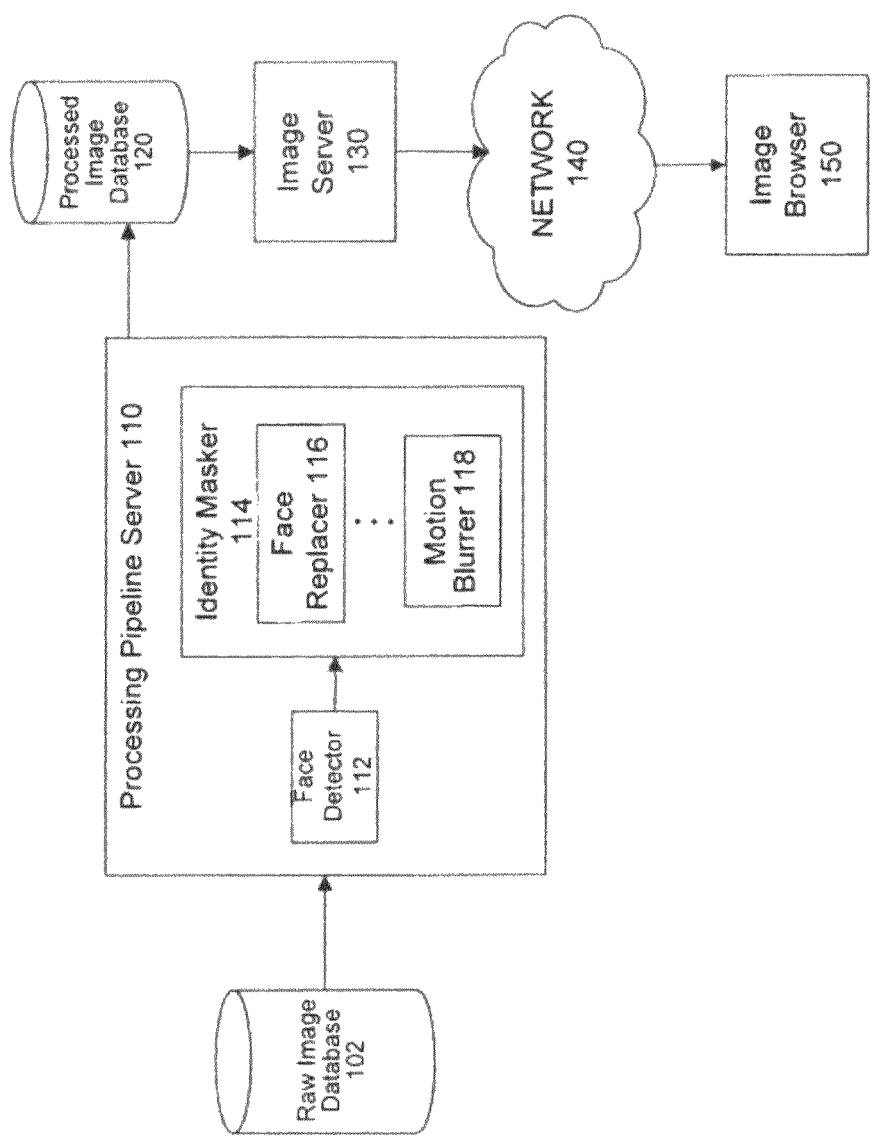
FIG. 1 is a diagram of an exemplary system 100 for performing identity masking on images which may be viewed through a network.

FIG. 1 illustrates an exemplary system 100 for identity masking according to one embodiment of the present invention. System 100 includes an image database of unprocessed images (or raw images), raw image database 102. Raw image database 102 is connected to processing pipeline server 110, which includes a face detector 112 and an identity masker 114. Processing pipeline server 110 detects faces in an image using face detector 112, and obscures the corresponding identities using identity masker 114. System 100 farther includes one or more image storage components, such as an image database for storing processed images. Such a database is shown as processed image database 120, which is accessible by an image server 130. Image server 130 can be accessed by image viewers. In the illustrated embodiment, access can be provided through network 140. Image browser 150 is connected to network 140 in order to access the processed images through image server 130. Identity masker 114 includes a set of identity masking tools using different identity masking algorithms. These tools include face replacer 116, which implements face replacement algorithms to replace a detected face by a substitute facial image. Another tool is motion blurrer 118, which implements motion blur algorithms to blur a face detected by face detector 112 as if it were photographed while in motion.

Note that in alternative embodiments or applications of the invention, other sources of raw images may be used instead of a raw image database. A particular raw image may be provided directly by a user, for example. Raw images may also be taken from a video.

Moreover, server 110 and the logic shown therein may be implemented in software, hardware, or firmware, or a combination thereof. Server 110 may, for example, be implemented on one or more customized or general purpose computers, where the face detector 112, identity masker 114, face replacer 116, and motion blurrer 118 are implemented as software.

Network 140 can be any network or combination of networks that can carry data communications, and may be referred to herein as a computer network. Such a network can include, but is not limited to, a local area network, medium area network, and/or wide area network such as the Internet. Network 140 can support protocols and technology including, but not limited to, World Wide Web protocols and/or services. Intermediate web servers, gateways, or other servers (not shown) may be provided between components of system 100 depending upon a particular application or environment.

In order to obscure a face in a raw image, the region that contains the face needs to be detected first. This can be done by a face detection algorithm. Because the purpose of identity masking is to obscure identities of individuals whose faces appear in an image, the face detection algorithm needs to identify possible face regions in the image.

In one embodiment of the invention, processing pipeline server 110 in FIG. 1 gets a raw image from raw image database 102. Processing pipeline server 110 uses face detector 112 to detect regions corresponding to faces (or face regions) in the raw image. In one embodiment of the invention, the sensitivity of face detector 112 is adjusted to detect as may face regions as possible. The initially detected face regions may include true hits containing faces and false positives that do not actually correspond to faces. To limit the obscuring effects on the false positives, face detector 112 may use verification criteria to verify the detected regions and reject false positives. In one embodiment of the invention, skin color analysis is used to verify if a detected region has a natural skin color. The regions that are mistakenly detected as faces are considered false positives. Processing pipeline server 110 can also ask identity masker 114 to use identity masking algorithms to handle potential false positives based on verification criteria. For example, in one embodiment, a blur algorithm based on such verification criteria can be used to process potentially false positives. The blur algorithm is applied on the basis of the probability that an area of color is a natural skin color. Higher probability results in greater blurring.

Because some images may contain images that are not subject to privacy issues, the detected regions with such contents may not need identity masking. In one embodiment, face detector 112 may search an image database to verify if a detected region matches such an image. If the detected region has a match in the database, it is unmarked and is not processed for identity masking.

Once the face regions are detected, an identity masking algorithm can be applied to make the face regions unrecognizable so that the corresponding identities are obscured. In various embodiments of the invention, there are several ways to obscure the identities of the detected face regions in the image. The faces in the face regions can be blurred, replaced by substitute facial images not subject to privacy issues, etc.

As illustrated in FIG. 1, after face detector 112 detects a set of face regions in a raw image, processing pipeline server 110 calls identity masker 114 to obscure identities corresponding to the detected face regions. In one embodiment of the invention, identity masker 114 uses motion blurrer 118 to make a detected face region appear as if it is in motion. In another embodiment of the invention, identity masker 114 uses face replacer 116 to replace a detected face region with a substitute facial image. In an alternative embodiment, both motion blurrer 118 and face replacer 116 are used by identity masker 114.

Figure 2A:
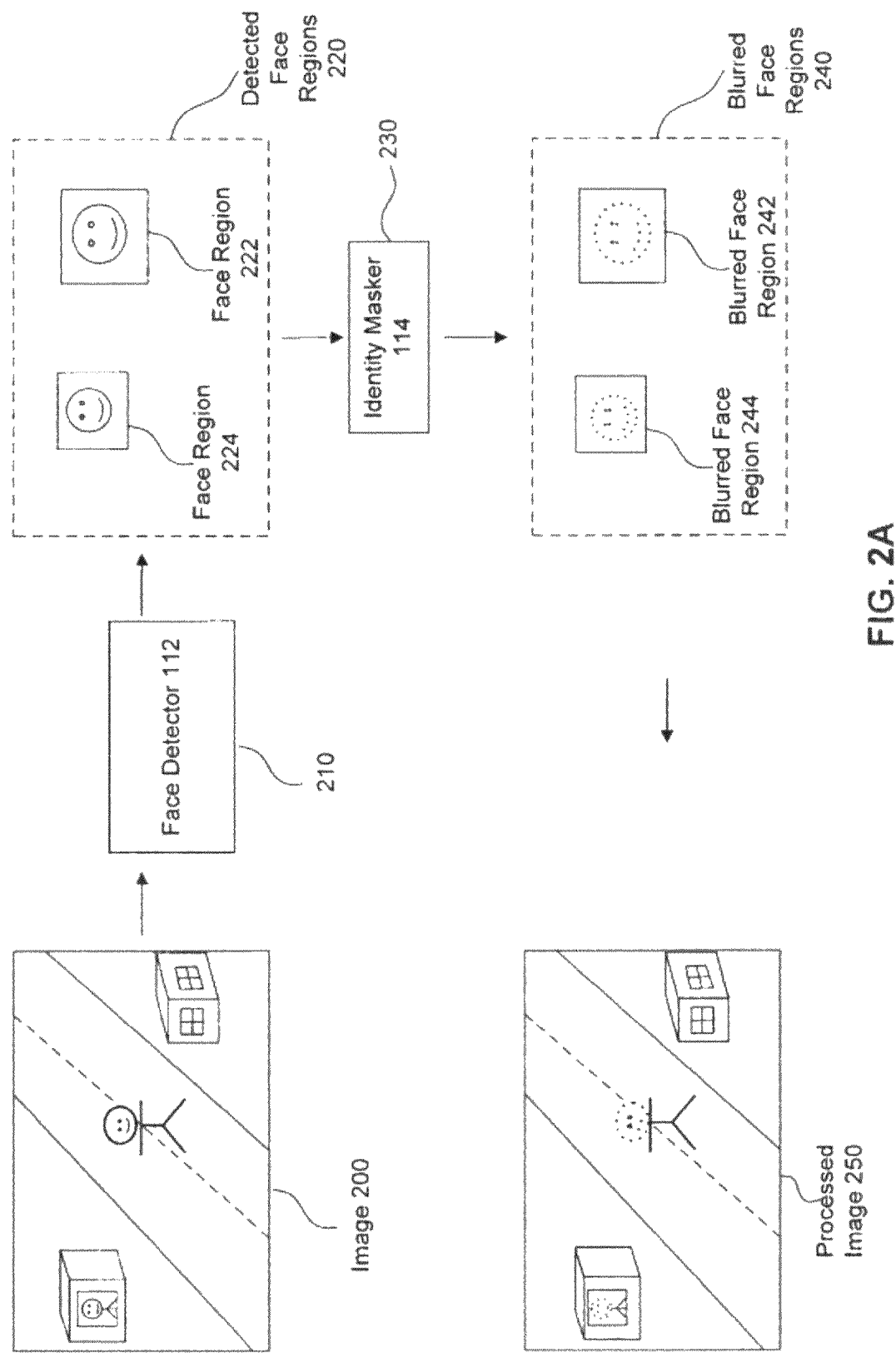
FIG. 2A is an example of identity masking an image using motion blur according to an embodiment of the present invention.

For example, in one embodiment of the invention, as illustrated in FIG. 2A, image 200 is a raw image containing two faces. In process 210, face detector 112 takes image 200 as input, detects two regions containing two respective faces, and outputs information about the two detected face regions, region 222 and region 224. In the illustrated embodiment, the identity masker 114 chooses to motion blur the detected face regions in process 230. Region 222 and region 224 are changed to region 242 and region 244 using the motion blur algorithm in process 230. The blurred face regions 240 containing regions 242 and 244 are output to processed image 250.

Figure 2B:
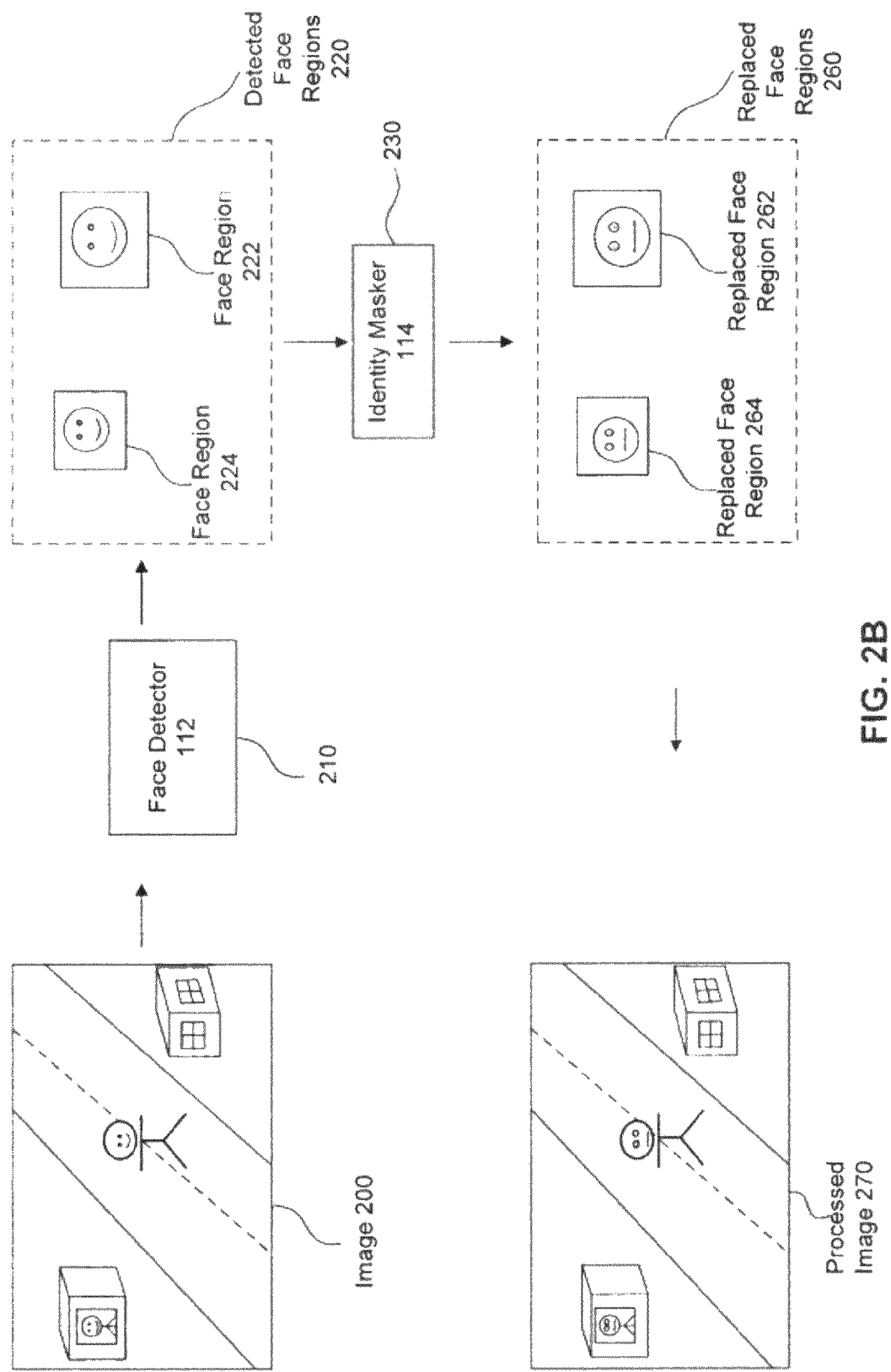
FIG. 2B is an example of identity masking an image using face replacement according to another embodiment of the present invention.

In another embodiment of the invention, the identity masker 114 replaces the detected face regions with substitute facial images as illustrated in FIG. 2B. Region 242 and region 244 are replaced by regions 262 and 264 using a face replacement algorithm in process 230. The replaced face regions 260 containing regions 262 and 264 are output to a processed image 270.

Figure 2C:
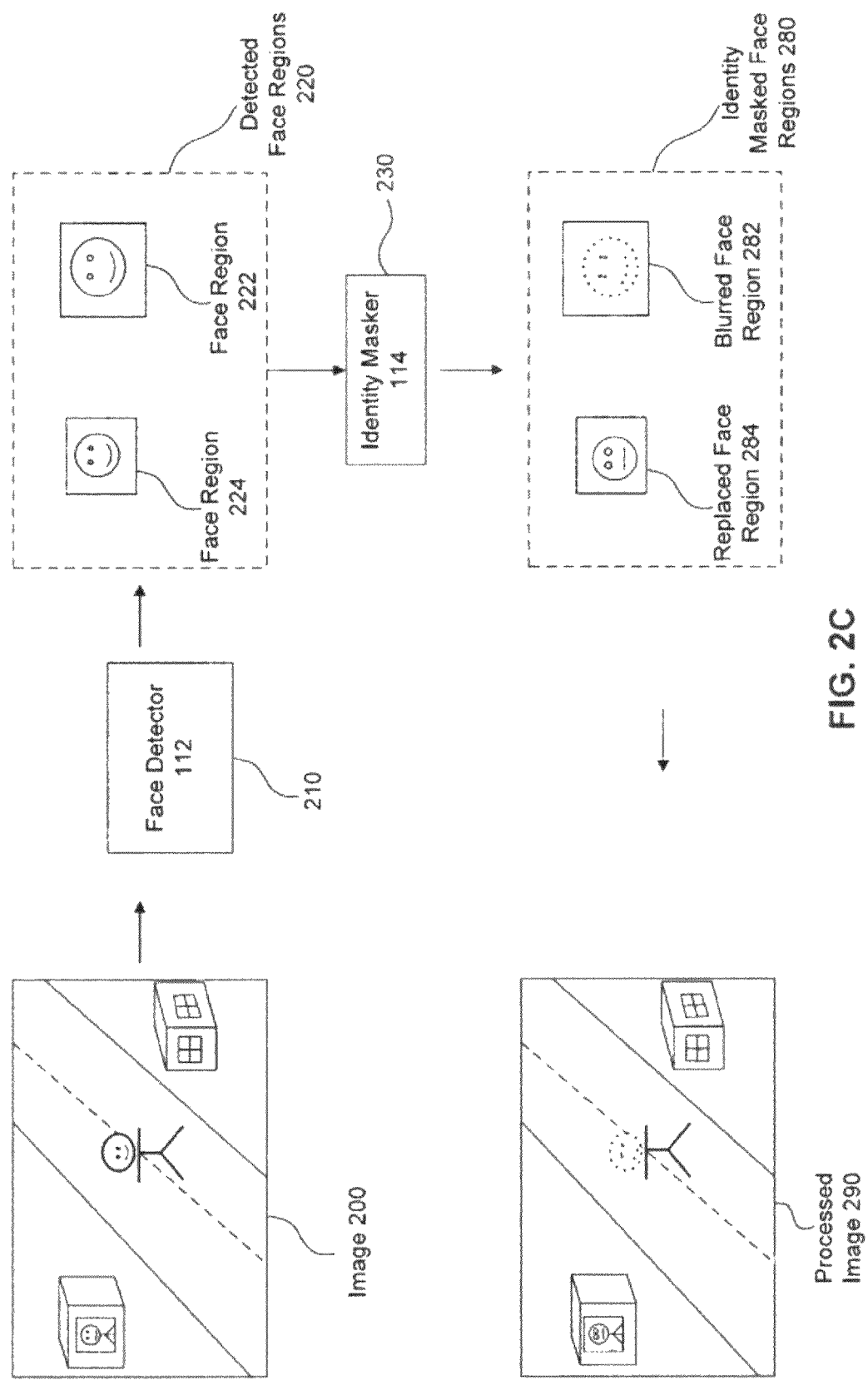
FIG. 2C is an example of identity masking an image using bath motion blur and face replacement according to another embodiment of the present invention.

The identity masker can also use different identity masking algorithms to process different detected face regions respectively. For example, as illustrated in FIG. 2C, region 222 is motion blurred to create region 282, and region 224 is replaced by region 284. The identity masked face regions 280 are output to create a processed image 290. Alternatively, the identity masker can apply two or more different identity masking algorithms on the same detected face regions to mask their identities.

Note that the drawings are for illustrative purposes. The detected face regions are not necessarily in regular shapes such as rectangles or squares as illustrated in the figures.

Figure 3A:
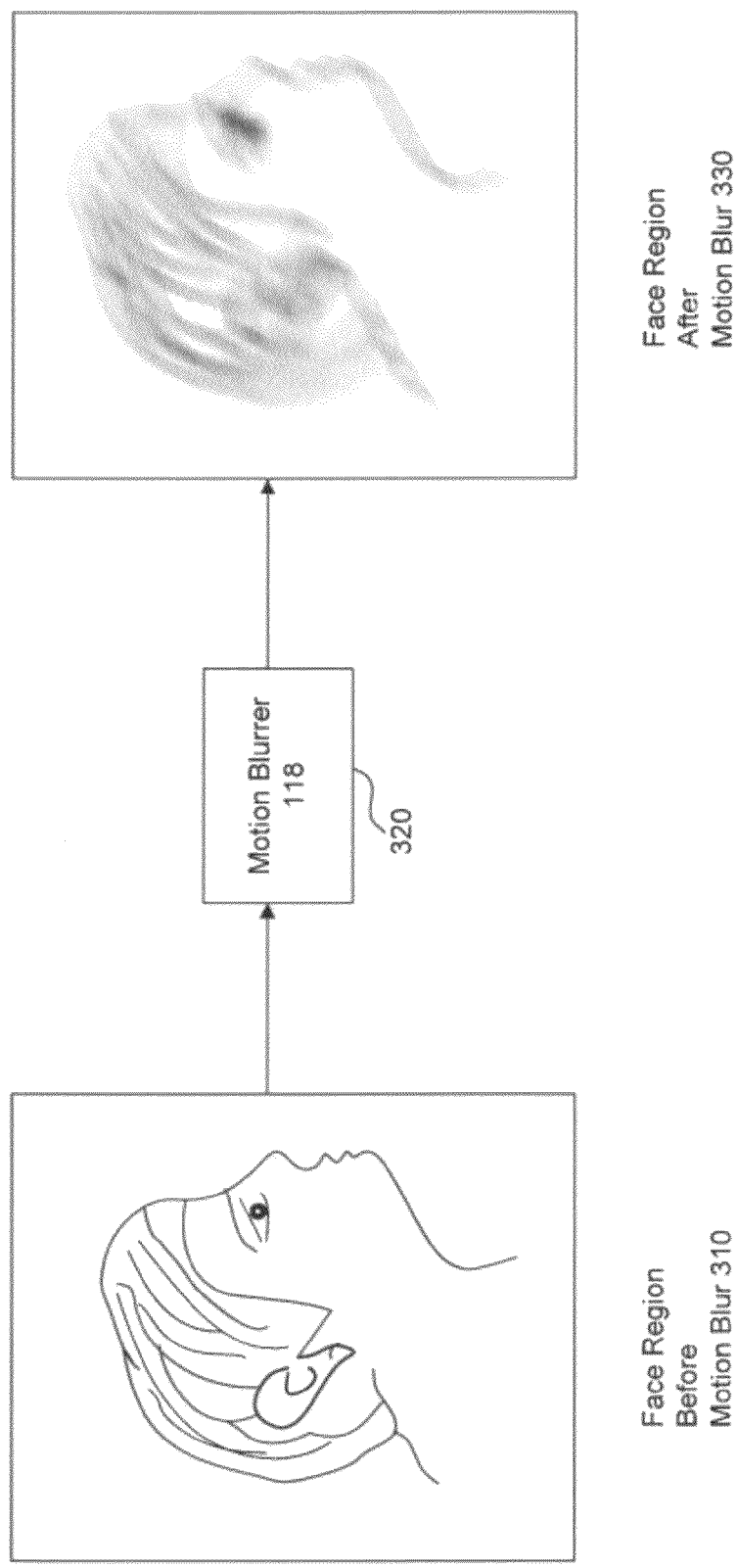
FIG. 3A is an example of motion blurring a face region.

Motion blurrer 118 can use a motion blur algorithm to make the original face region in an image appear as if the face has been photographed while in motion or out of focus. FIG. 3A shows an illustration of motion blur. The original detected face region 310 is processed by motion bluffer 118 using a motion blur algorithm in process 320. The output is a motion blurred face region 330.

Another possible way to obscure the identity of a face is by replacing the face with a substitute facial image. The substitute facial image can be a facial image not subject to privacy concerns, or a generated face different than the original face. There are many techniques available to generate a face. For example, in one embodiment, a face may be generated from a 3D computer graphics model, which can match the lighting in the image. Face replacement using such generated faces can have result in a more natural appearance of the image than other replacement methods.

Figure 3B:
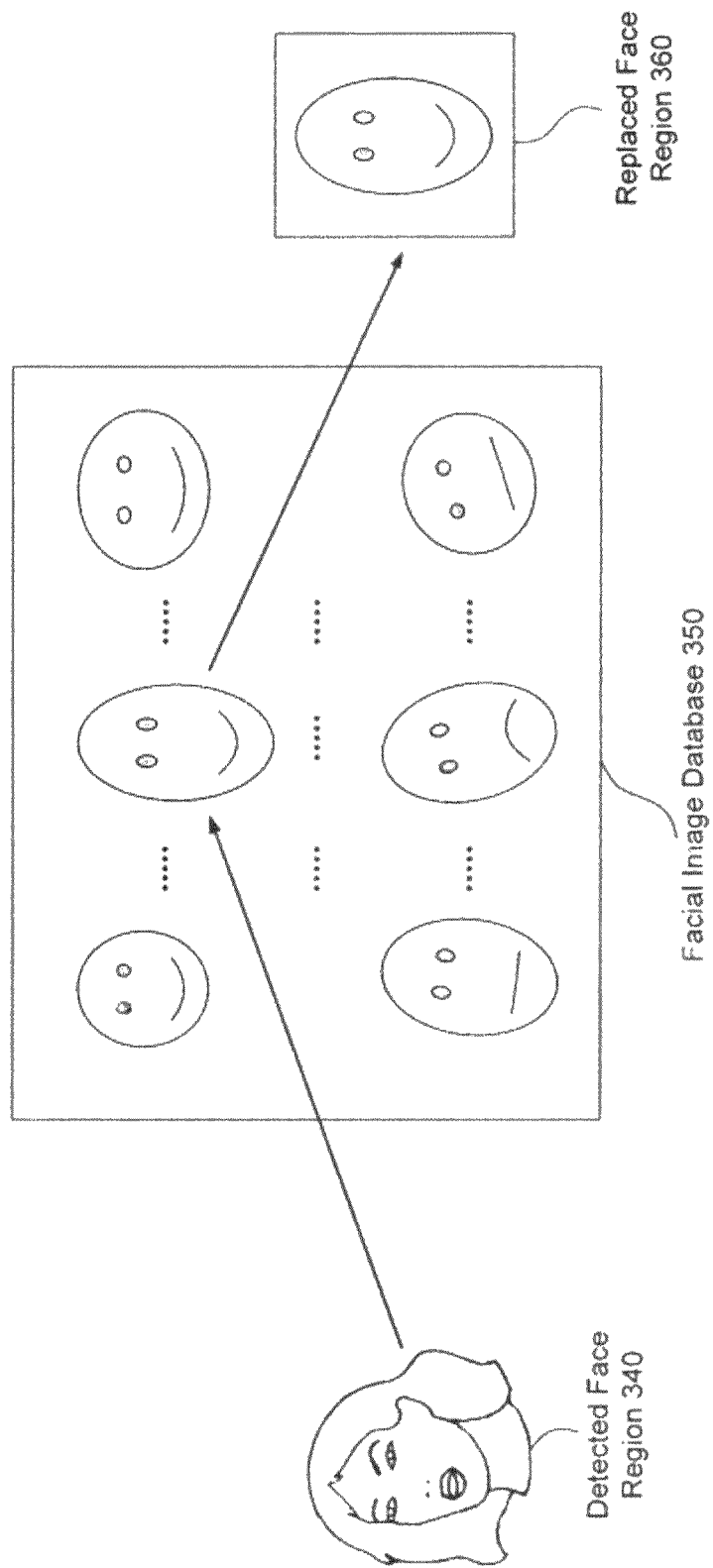
FIG. 3B is an example of replacing a face region using a generated facial image based on a matching image from a facial image database.

FIG. 3B illustrates one way to replace a detected face region with a substitute facial image that is selected from a facial database. First by looking up the facial image database 350, a substitute facial image is selected based on the profile of the detected face region 340. The profile may include orientation, facial features (e.g. size, eyes, nose, mouth, etc.), or even three-dimensional information such as depth of the face. In order to replace the detected face without affecting neighboring regions of the image, the substitute facial image should have a similar orientation and size as the detected face. It can also have similar positions of facial features. Then the detected face region 340 is replaced by the substitute facial image 360. In an alternative embodiment, a substitute facial image can be generated by mixing the selected facial image with the detected face region. Because the generated facial image is different than the original detected face region, the identity of detected face region 340 is obscured.

Note that the claimed invention is not limited to these two types of identity masking algorithms. Other algorithms for identity masking can also be used.

Figure 4:
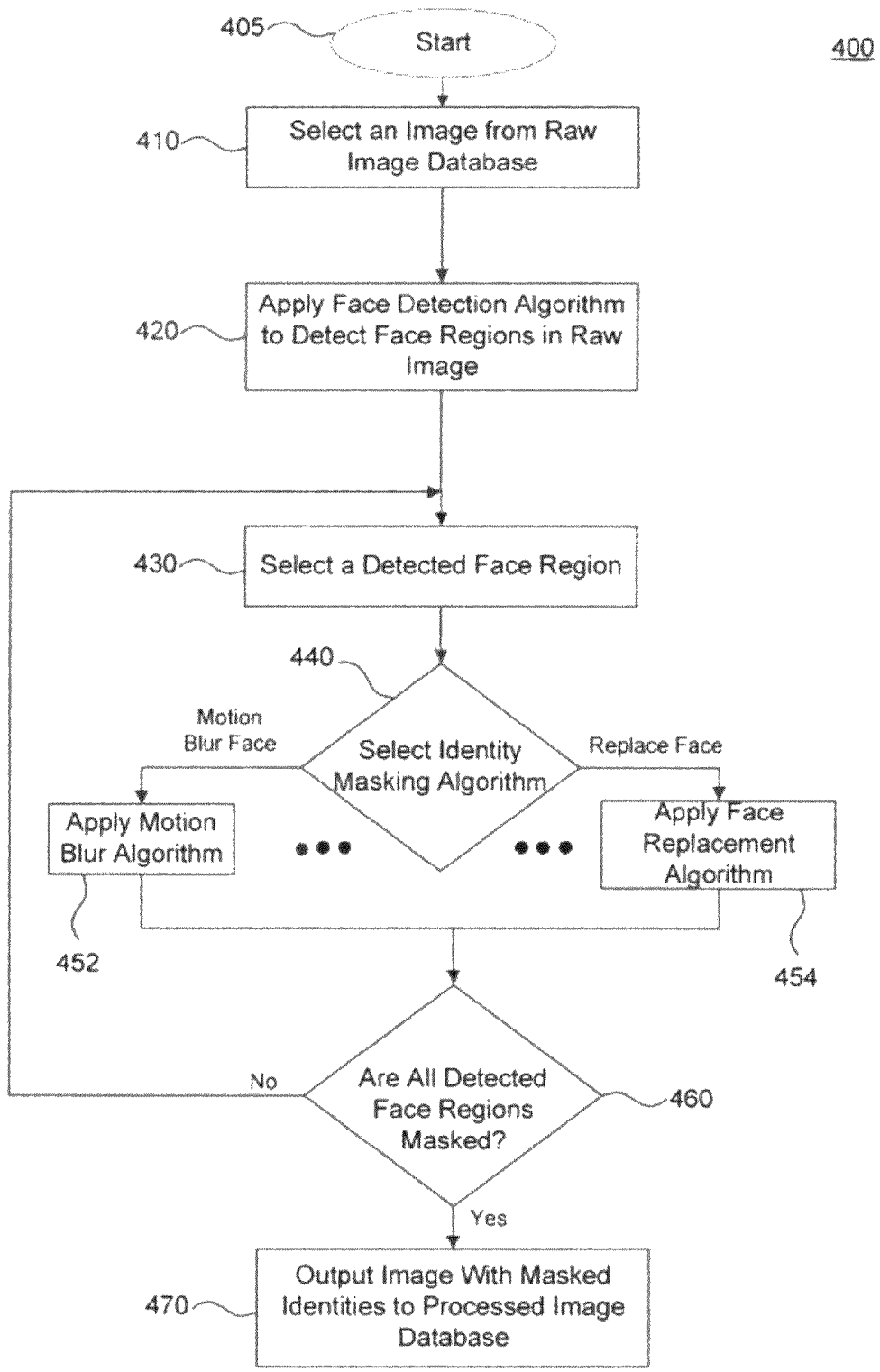
FIG. 4 is a flow chart of an exemplary process for identity masking an image.

FIG. 4 is a flow chart of an exemplary process 400 for identity masking according to one embodiment of the invention. In stage 410, a raw image is selected from a raw image database. The raw image database can be any storage means to store images. For example, it can be raw image database 102 in FIG. 1. In alternative embodiments, the raw image can come from other sources such as video, etc. A face detector (e.g. face detector 112) is used to detect face regions in the selected raw image using a face detection algorithm in stage 420. The detected face regions will be processed to obscure corresponding identities. In stage 430, a detected face region is selected. To obscure the identity of the selected face region, an identity masking algorithm is chosen in stage 440. A motion blur algorithm can be applied to obscure the identity in stage 452, or a face replacement algorithm can be applied in stage 454. In an alternative embodiment, there is no selection stage 440, and one or more fixed masking algorithms are used each time.

Other identity masking algorithms can also be used. For example, in one embodiment of the invention, a blur algorithm based on skin color can be chosen to obscure the identity. Each pixel in the selected face region is blurred in proportion to its probability of having a natural skin color. Therefore if the selected region has a low probability of corresponding to a human face based on color, the blurring effect performed on the region will be little.

After the chosen identity masking algorithm obscures the identity of the selected region, processing pipeline server 110 will determine in stage 460 if all detected face regions have been processed. If there are detected face regions which have not been processed, the routine will go back to stage 430 to select the next detected face region. Otherwise, if all the detected face regions in the selected raw image are processed, the processed image will be output in stage 470 to processed image database 120.

Note that in the illustrated embodiment, a selected region is processed by one identity masking algorithm. In alternative embodiments, one or more identity masking algorithms can be applied on the same selected region to mask the corresponding identity.

Also note that in the illustrated embodiment, selected face regions are processed in serial. Alternatively, the selected face regions may be processed in parallel.

Figure 5:
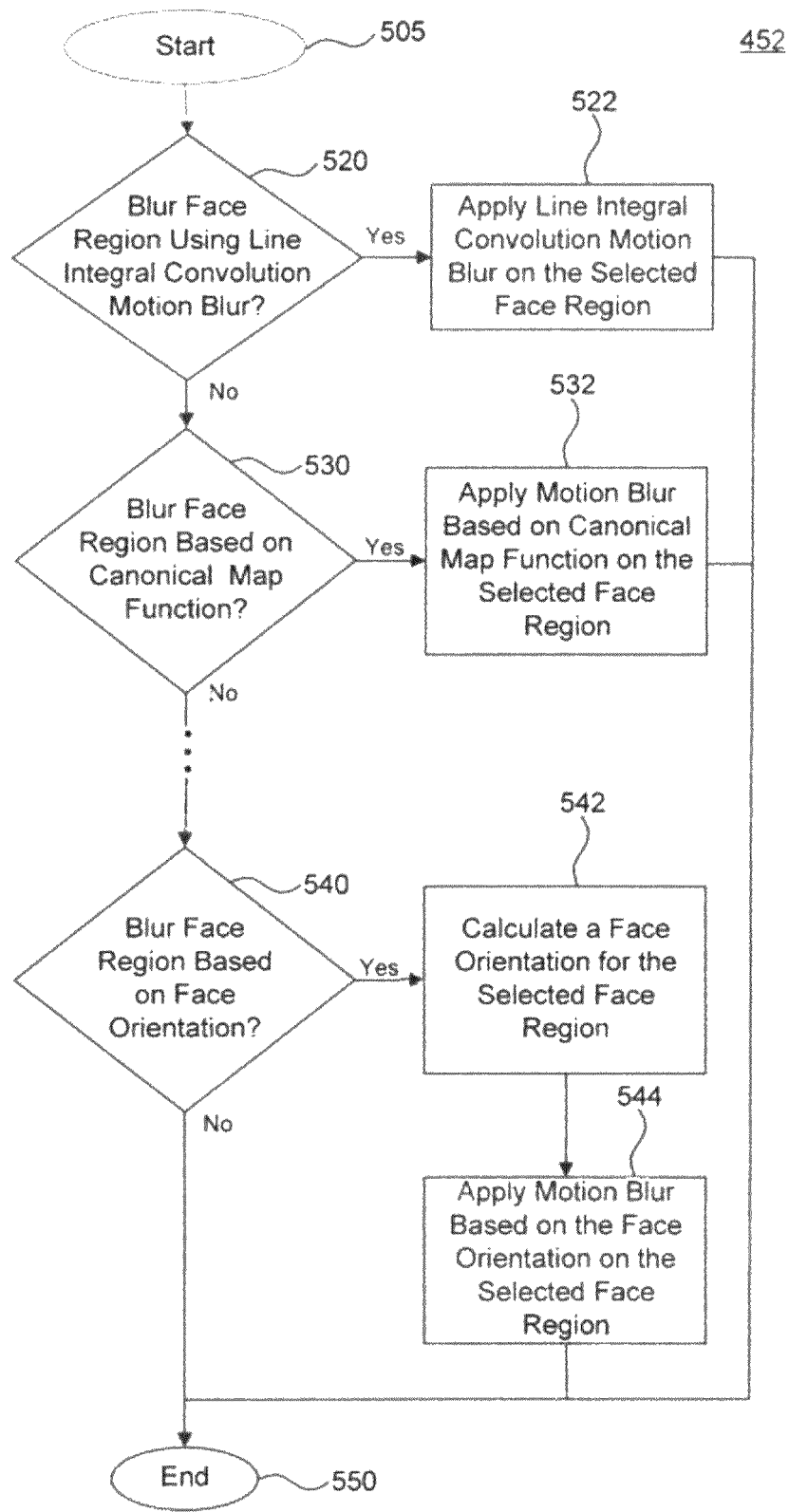
FIG. 5 is a flow chart of an exemplary process for identity masking a face region by motion blur.

FIG. 5 is a flow chart for an exemplary process 452 of identity masking using motion blur according to one embodiment of the invention. Once a detected face region is selected and motion blurring is chosen, a particular motion blur algorithm needs to be chosen to obscure the identity of the selected face region.

Several motion blur algorithms are available to obscure the selected face region such as the Line Integral Convolution motion blur, motion blur based on a Canonical Map Function, motion blur based on face orientation, etc. In alternative embodiments, other blur algorithms may be used. In other embodiments, more than one blur algorithm may be applied to a selected face region.

For example, if Line Integral Convolution (LIC) motion blur is chosen in stage 520, the Line Integral Convolution motion blur is applied to the selected face region in stage 522 for the motion blur effect. LIC is well known in the art for visualizing a vector field of an image. It can involve selectively blurring the image as a function of the vector field to be displayed. In one embodiment, to motion blur a face region, a vector field associated with the face region is created to represent the direction and extent of motion for each pixel in the blur. By varying the direction and the extent of motion of the vector field, the face region can be motion blurred in different directions with different amounts of blur.

If blurring based on a Canonical Map Function is chosen in stage 530, the Canonical Map Function algorithm is applied in stage 532. Canonical Map Function is also well known in the art as an average estimation of three-dimensional depth When aligned with the selected face. Then the selected face region can be motion blurred according to the face depth.

If in stage 540, blurring based on the face orientation is chosen, the orientation of the selected face region needs to be calculated first in stage 542. The orientation of a face in an image relates to where the corresponding individual is facing. For example, the individual may directly face the camera, i.e., to the front. Or the individual may face to the left or right of the camera. In one embodiment of the invention, the orientation of the selected face region may comprise a face direction vector, an image vector, and an angle between them. The face direction vector is a vector representing the direction of the face. The image vector is a vector associated with the image.

For example, the face direction vector can be a vector in the direction of the nose, and the image vector can be a vector perpendicular to the image. Then the motion blur algorithm based on face orientation is applied to the selected face region in stage 544. In one embodiment of the invention, the blurring corresponds to the motion of the face turning in the direction of increasing/decreasing the angle between the face direction vector and the image vector.

The present invention is not limited to the above mentioned motion blur algorithms for identity masking. In alternative embodiments of the invention, other motion blur or image blur algorithms can also be applied upon selection. In some embodiments of the invention, because the blur algorithms have different extents of blur at different locations of the face region, the blurring process is irreversible or irrecoverable.

Figure 6:
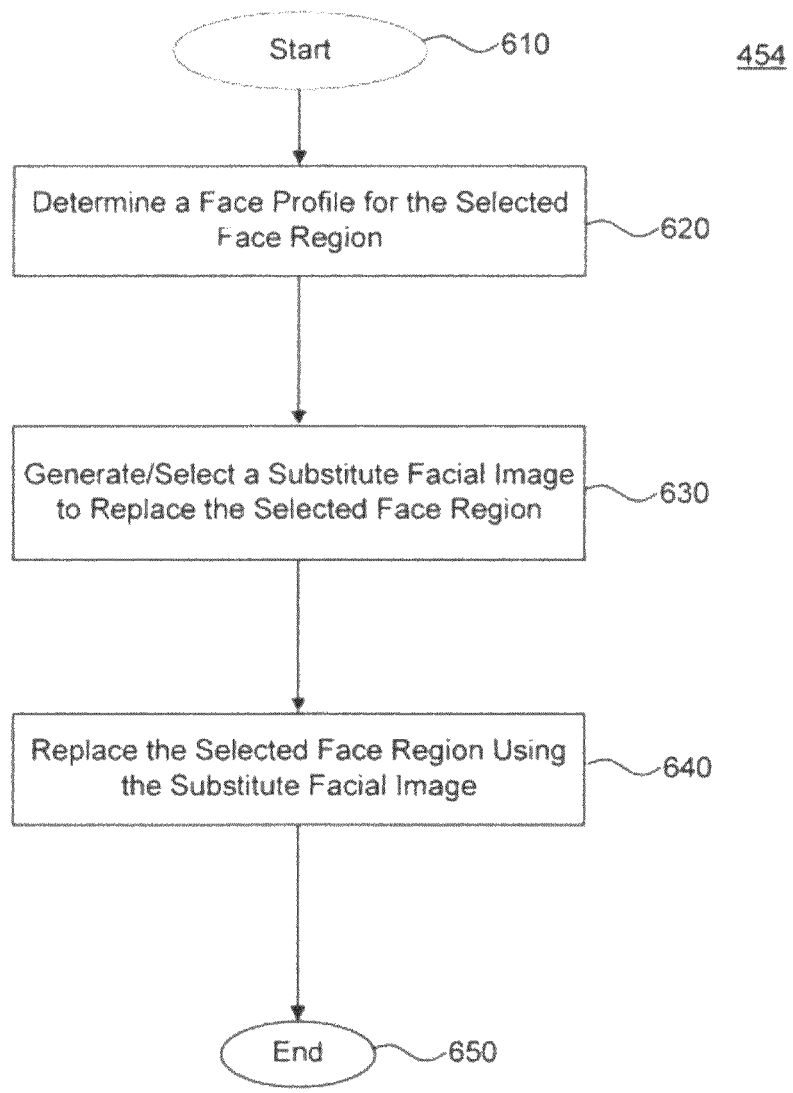
FIG. 6 is a flow chart of an exemplary process for identity masking a face region by face replacement.

FIG. 6 is a flow chart of an exemplary process 454 for identity masking using face replacement algorithms according to one embodiment of the invention. Here, a substitute facial image replaces a selected face region in an image, so that the identity of the selected face region is obscured. A face profile is determined for the selected face region in stage 620. The face profile is often used in face recognition algorithms to identify a face. For example, the face profile can include locations and shapes of eyes, nose and mouth, face outline, face orientation, etc. Based on the face profile, a substitute facial image can be either generated or selected from a face database in stage 630. There are different ways to generate the substitute facial image. According to one embodiment of the invention, the substitute facial image can be generated by mixing one or more corresponding features of the selected face region and a facial image selected from the face database. In yet another embodiment of the invention, the substitute facial image can be generated by mixing some features of two or more detected face regions in the image. To replace the selected face region without affecting the layout of the original image, the substitute facial image should have a size similar to the selected face region. For example, in one embodiment, the difference between lengths or heights of the two image regions can be less than 5% of the length or height of the selected face region. Once the substitute facial image is available, in stage 640, the selected face region is replaced by the substitute facial image to obscure the corresponding identity.

Figure 7:
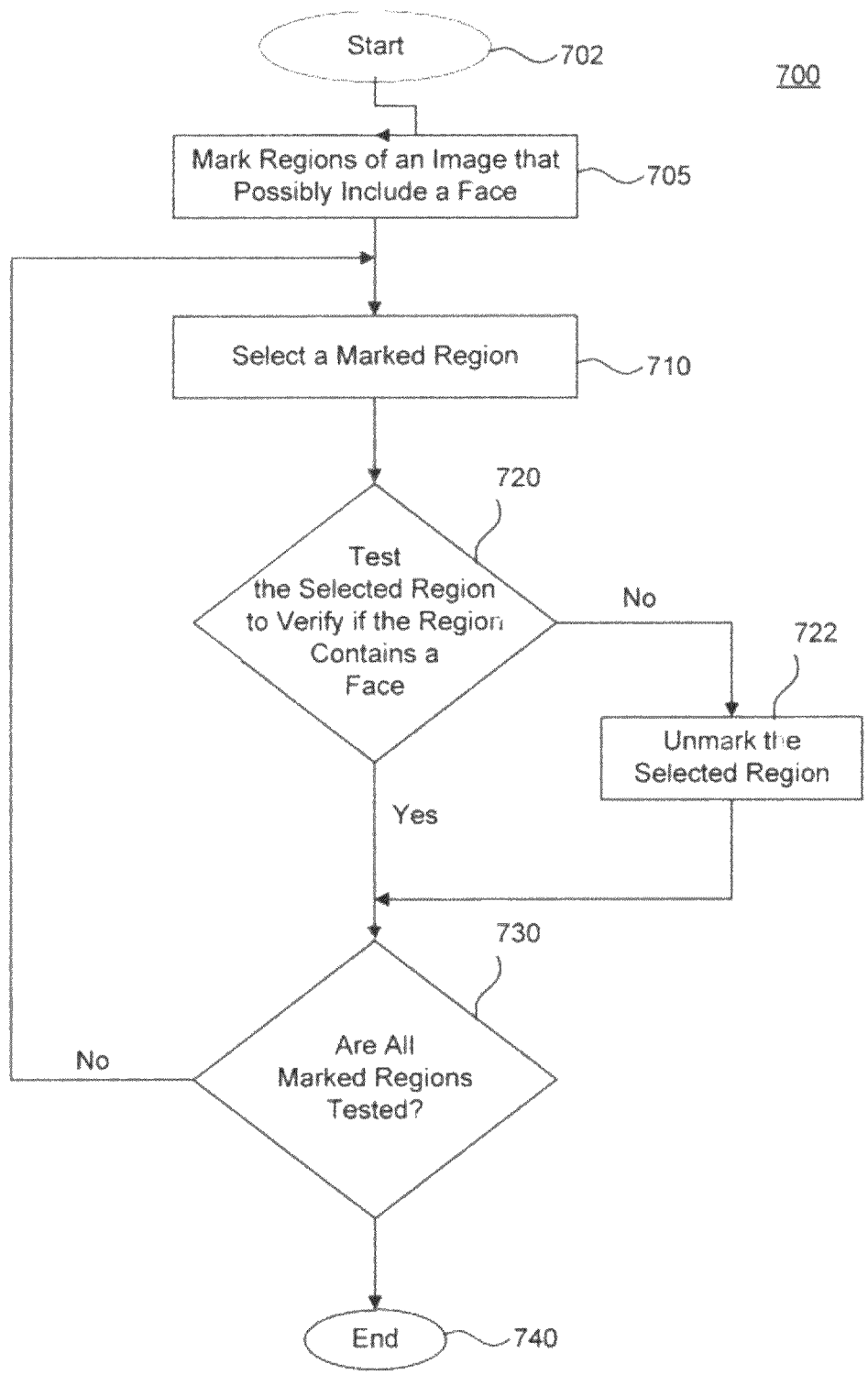
FIG. 7 is a flow chart of an exemplary process for detecting face regions in an image with the sensitivity of the face detection algorithm tuned to detect possible face regions, with a subsequent verification process.

To obscure identities for a set of faces in an image, the face detection algorithm needs to detect possible face regions. In one embodiment of the invention, the sensitivity of the face detection algorithm is tuned to detect as many regions corresponding to faces as possible. There may be detected regions not corresponding to faces, which are usually referred as false positives. To exclude such false positives, a verification procedure may be applied based on pre-defined criteria. FIG. 7 is a flow chart of an exemplary process 700 for rejecting false positives of the face detection algorithm according to one embodiment of the invention. First in stage 705, the face detector marks regions of an image that possibly include a face. The sensitivity of the face detector is tuned to mark as many face regions as possible, including both true hits and false positives. Then a marked region is selected in stage 710. In stage 720 the selected region is tested using pre-defined verification criteria to verify that the region contains a face. The verification criterion can be defined based on skin color, three-dimensional face profile, etc. If the selected region does not contain a face, it will be unmarked in stage 722. In stage 730, if all marked regions are tested, the procedure ends. Otherwise, the procedure goes back to stage 710, to select another marked region for verification.

Note that in the illustrated embodiment, the process of rejecting false positives is performed in serial. In alternative embodiments, the process may be performed in parallel.

Figure 8:
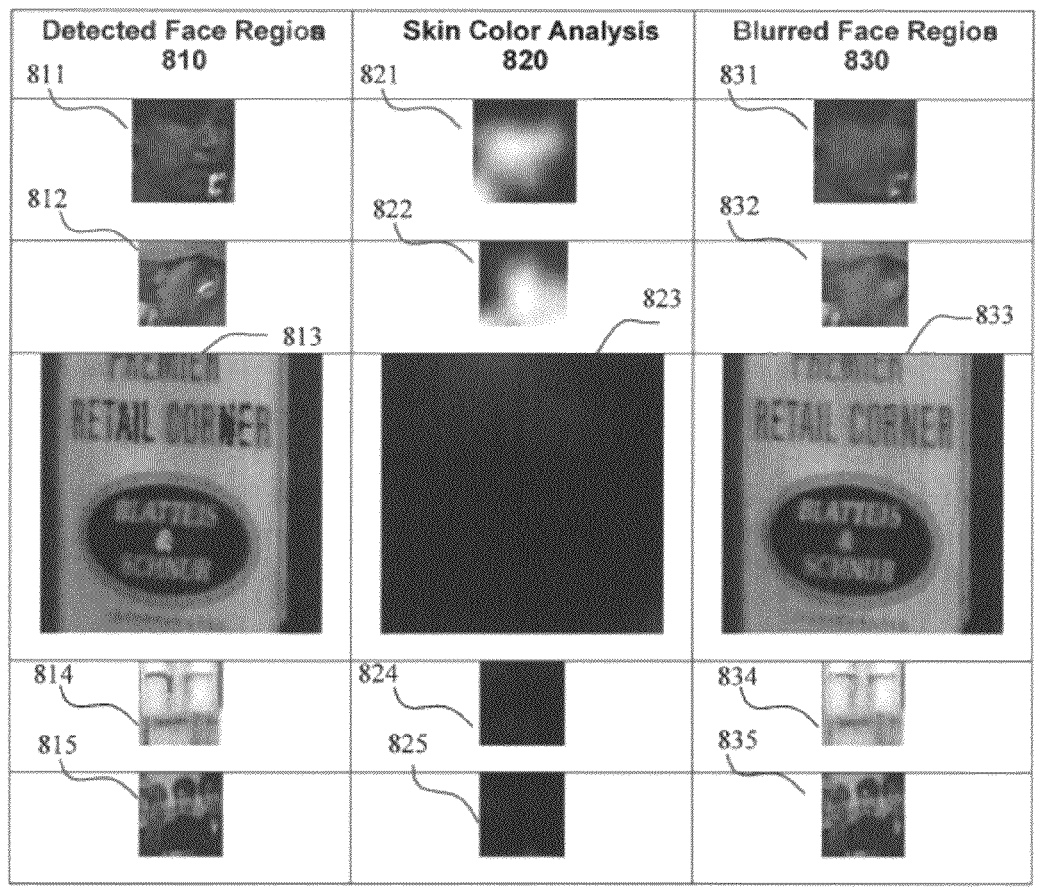
FIG. 8 is a table of several examples of face blurring based on skin color analysis to reject false positives detected by a face detector.

FIG. 8 shows some examples for excluding false positives based on skin color analysis. Column 810 of the table 800 contains the original detected face regions from input images. The face regions 811 and 812 in column 810 correspond to faces. The regions 813 and 814 are falsely detected regions other than human faces, and region 815 is a poster with human figures in black and white. In one embodiment of the invention, a skin color analysis is applied to verify the above mentioned regions. The results of skin color analysis of the above five detected regions are listed in column 820 of the table. The skin color analysis results 821 and 822 indicate that the corresponding detected regions 811 and 812 include human skin colors and may therefore contain human faces. The skin color analysis results 823-825 indicate that the corresponding detected regions 813-815 are false positives. Note that, although region 815 has human faces, if they are in black and white, thus region 815 is indicated as a false positive. The detected regions are then blurred based on the skin color analysis. The final results are listed in column 830, and only regions containing human faces are blurred, i.e. images 831 and 832.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for obscuring one or more identities in an image, comprising:
   detecting, in the image, a region corresponding to a face;
   determining an orientation of the face;
   replacing the region with a substitute facial image; and
   after the replacing motion blurring the substitute facial image based on the determined orientation.

2. The method of claim 1, wherein the determining the orientation comprises:

associating a first vector with the face; and
determining a relationship between the first vector and a second vector associated with the image.

3. The method of claim 1, wherein replacing the region with a substitute facial image comprises:
replacing the region of the image with a substitute facial image that is chosen based on the orientation of the face.

4. The method of claim 3, wherein the substitute facial image has an orientation similar to the orientation of the face.

5. The method of claim 1, wherein replacing the region with a substitute facial image comprises:
selecting the substitute facial image from a face database.

6. The method of claim 1, wherein replacing the region with a substitute facial image comprises:
generating the substitute facial image, wherein the substitute facial image has a size similar to the region of the image.

7. The method of claim 1, wherein replacing the region with a substitute facial image comprises:
generating a substitute facial image based on one or more features of the face.

8. The method of claim 7, wherein the one or more features of the face include at least one of a nose, an eye, a mouth, and an outline of the face.

9. A system for obscuring an identity in an image, comprising:
a processing pipeline server configured to obscure the identity in the image, wherein the processing pipeline server comprises:
a face detector configured to detect a region in the image corresponding to a face; and
an identity masker configured to obscure the identity corresponding to the detected region including being configured to:
determine an orientation of the face;
replace the region with a substitute facial image; and
after the replacement, motion blur the substitute facial image based on the determined orientation.

10. The system of claim 9, wherein the substitute facial image has an orientation similar to the orientation of the face.

11. The system of claim 9, wherein the identity masker is further configured to:
associate a first vector with the face; and
determine a relationship between the first vector and a second vector associated with the image.

12. The system of claim 9, wherein the identity masker is further configured to:
replace the region of the image with a substitute facial image that is chosen based on the orientation of the face.

13. The system of claim 9, wherein the identity masker is further configured to:
generate a substitute facial image based on one or more features of the face.

14. The system of claim 13, wherein the one or more features of the face include at least one of a nose, an eye, a mouth, and an outline of the face.

15. A non-transitory computer readable storage medium having computer program logic recorded thereon for enabling a processor to obscure an identity in an image, said computer program logic comprising instructions for:
detecting, in the image, a region corresponding to a face;
determining an orientation of the face;
replacing the region with a substitute facial image; and
after the replacing, motion blurring the substitute facial image based on the orientation.

16. The non-transitory computer readable medium of claim 15, wherein the determining the orientation comprises:
associating a first vector with the face; and
determining a relationship between the first vector and a second vector associated with the image.

17. The non-transitory computer readable medium of claim 16, wherein replacing the region with a substitute facial image comprises:
replacing the region of the image with a substitute facial image that is chosen based on the orientation of the face.

18. The non-transitory computer readable medium of claim 16, wherein replacing the region with a substitute facial image comprises:
generating a substitute facial image based on one or more features of the face.

19. The non-transitory computer readable medium of claim 18, wherein the one or more features of the face include at least one of a nose, an eye, a mouth, and an outline of the face.

\* \* \* \* \*

UNITED STATES PATENT AND TRADEMARK OFFICE
CERTIFICATE OF CORRECTION

PATENT NO. : 8,509,499 B2
APPLICATION NO. : 13/302634
DATED : August 13, 2013
INVENTOR(S) : Ioffe et al.

It is certified that error appears in the above-identified patent and that said Letters Patent is hereby corrected as shown below:

Title page
Item (75) Inventors, please replace "Sergey Ioffee, Mountain Veiw, CA" with --Sergey Ioffee, Mountain View, CA--.

Title page
Item (75) Inventors, please replace "Lance Williams, Mountain Veiw, CA" with --Lance Williams, Mountain View, CA--.

Signed and Sealed this
Nineteenth Day of November, 2013

Teresa Stanek Rea
*Deputy Director of the United States Patent and Trademark Office*